(12) United States Patent
Sun et al.

(10) Patent No.: US 12,242,786 B2
(45) Date of Patent: Mar. 4, 2025

(54) METHOD OF TRANSFORMER

(71) Applicant: Delta Electronics (Shanghai) Co., Ltd., Shanghai (CN)

(72) Inventors: Liping Sun, Shanghai (CN); Hongyang Wu, Shanghai (CN); Jianjun Ni, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 627 days.

(21) Appl. No.: 17/456,363

(22) Filed: Nov. 23, 2021

(65) Prior Publication Data
US 2022/0164512 A1 May 26, 2022

(30) Foreign Application Priority Data
Nov. 24, 2020 (CN) .......................... 202011335188.7

(51) Int. Cl.
*H01F 30/12* (2006.01)
*G06F 30/36* (2020.01)
(Continued)

(52) U.S. Cl.
CPC ........ *G06F 30/367* (2020.01); *G06F 2119/06* (2020.01)

(58) Field of Classification Search
CPC .... G06F 30/367; G06F 2119/06; G06F 30/36; H01F 30/12; H01F 29/12; H02M 1/0012; H02M 1/0064; H02M 7/08; H02J 7/06
See application file for complete search history.

(56) References Cited

U.S. PATENT DOCUMENTS 2,783,432 A * 2/1957 Harz ...................... H02K 19/30
322/20
4,013,942 A 3/1977 Boshnyaga et al.
(Continued)

FOREIGN PATENT DOCUMENTS

CN 201956919 U 8/2011
CN 202034912 U 11/2011
(Continued)

OTHER PUBLICATIONS

Texas Instruments (TI), Section 4—Power Transformer Design, pp. 4-1-4.13, Jul. 30, 2001 (Year: 2001).*
(Continued)

*Primary Examiner* — Nghia M Doan
(74) *Attorney, Agent, or Firm* — CKC & Partners Co., LLC

(57) ABSTRACT

A design method of a transformer repeats following steps until a preset condition is met: calculating an output voltage of each secondary winding according to a phase shift angle and a number of turns of the each secondary winding; obtaining a difference between output voltages of each secondary winding pair in a secondary winding set; adjusting the phase shift angle of at least one secondary winding in the secondary winding set; and obtaining a final number of turns for the each secondary winding according to a resultant phase shift angle corresponding to when the preset condition is met; where the preset condition is that the difference between the output voltages of any secondary winding pair in the secondary winding set is less than or equal to a preset threshold.

18 Claims, 8 Drawing Sheets

(51) Int. Cl.
*G06F 30/367* (2020.01)
*H02M 1/00* (2007.01)
*G06F 119/06* (2020.01)

(56) References Cited

U.S. PATENT DOCUMENTS

| | | | | |
|---|---|---|---|---|
| 8,279,640 | B2* | 10/2012 | Abolhassani | H01F 30/12 |
| | | | | 363/37 |
| 2010/0073970 | A1* | 3/2010 | Abolhassani | H01F 30/12 |
| | | | | 363/37 |
| 2013/0176756 | A1* | 7/2013 | Kruse | H01F 30/14 |
| | | | | 363/64 |
| 2020/0052486 | A1* | 2/2020 | Wichert | H02J 3/38 |

FOREIGN PATENT DOCUMENTS

| | | |
|---|---|---|
| CN | 106898487 A | 6/2017 |
| CN | 107257200 A | 10/2017 |

OTHER PUBLICATIONS

Corresponding extended European Search Report mailed on Apr. 12, 2022.

* cited by examiner

METHOD OF TRANSFORMER

CROSS-REFERENCE TO RELATED APPLICATIONS

This application claims priority to Chinese Patent Application No. 202011335188.7, filed on Nov. 24, 2020, entitled "DESIGN METHOD OF TRANSFORMER", which is incorporated herein by reference in its entirety.

TECHNICAL FIELD

The present disclosure relates to the technical field of power electronics, and in particular, to a design method of a transformer.

BACKGROUND

In existing centralized high-power electric vehicle charging systems, a primary winding of a multi-pulse transformer is connected to the power grid, secondary windings of the multi-pulse transformer are respectively connected to AC-DC charging modules, and the AC-DC charging modules are connected to the device to be charged. Because the number of turns of the secondary winding of the multi-pulse transformer is rounded, the output voltages of the secondary windings are unequal. As a result, uneven input currents may flow into rectifier bridge arms of the AC-DC charging module, thereby raising current stress of diodes in the rectifier bridge arm. As raising current stress, devices of the rectifier bridge have to leave sufficient allowance, which is unfavorable for the design of the rectifier bridge and the selection of capacitors restraining ripple current.

In the prior art, in order to realize the even current of the current input to the rectifier bridge, a balanced inductor is adopted at the output terminal of the rectifier bridge, which will increase the dimension and cost of the AC-DC charging module.

Therefore, there is an urgent need for a new design method of transformers to effectively reduce the dimension and cost of the charging system while realizing voltage stabilization and even currents.

SUMMARY

In view of the above problems, the present disclosure provides a design method of a transformer.

In a first aspect, the present disclosure provides a design method of a transformer, where the transformer includes at least one secondary winding set, each secondary winding set includes a plurality of secondary windings; and the method includes: repeating following steps until a preset condition is met: calculating an output voltage of each secondary winding according to a phase shift angle and a number of turns of the each secondary winding; obtaining a difference between output voltages of each secondary winding pair in a secondary winding set; adjusting the phase shift angle of at least one secondary winding in the secondary winding set; and obtaining a final number of turns for the each secondary winding according to a resultant phase shift angle corresponding to when the preset condition is met; where the preset condition is that the difference between the output voltages of any secondary winding pair in the secondary winding set is less than or equal to a preset threshold.

In another optional implementation, the calculating an output voltage of each secondary winding according to a phase shift angle and a number of turns of the each secondary winding includes: calculating a theoretical number of turns of the each secondary winding according to transformer parameters and the phase shift angle of the secondary winding; and rounding the theoretical number of turns of the secondary winding to obtain the number of turns of the each secondary winding.

In another optional implementation, the adjusting the phase shift angle of at least one secondary winding in the secondary winding set includes: adjusting a phase shift angle of an i-th secondary winding in the each secondary winding set according to a first preset incremental angle; and adjusting a phase shift angle of an (i+1)-th secondary winding in the each secondary winding set according to the first preset incremental angle if the phase shift angle of the i-th secondary winding has been adjusted according to the first preset incremental angle by more than a preset number of times but the preset condition is still not met, wherein i is greater than or equal to 1.

In another optional implementation, the adjusting the phase shift angle of at least one secondary winding in the secondary winding set further includes: adding a second preset incremental angle to initial phase shift angles of all secondary windings in the secondary winding set if the phase shift angles of all secondary windings in the secondary winding set have been adjusted according to the first preset incremental angle by more than the preset number of times but the preset condition is still not met, where the second preset incremental angle is greater than the first preset incremental angle.

In another optional implementation, the each secondary winding set includes N winding pairs, each winding pair includes a first secondary winding and a second secondary winding, and a difference between phase shift angles of the first secondary winding and the second secondary winding is 30°, where N is a positive integer.

In another optional implementation, when differences between output voltages of j winding pairs are greater than the preset threshold, the adjusting the phase shift angle of at least one secondary winding in the secondary winding set includes: adjusting a phase shift angle of the first secondary winding of each of the j winding pairs according to a first preset incremental angle; and adjusting a phase shift angle of the second secondary winding of the each of the j winding pairs according to the first preset incremental angle if the phase shift angle of the first secondary winding of the each of the j winding pairs has been adjusted according to the first preset incremental angle by more than a preset number of times but the preset condition is still not met, where $1<=j<=N$.

In another optional implementation, the adjusting the phase shift angle of at least one secondary winding in the secondary winding set further includes: adding a second preset incremental angle to initial phase shift angles of all secondary windings in the secondary winding set if the phase shift angles of the first secondary winding and the second secondary winding of any one of the j winding pairs have been adjusted according to the first preset incremental angle by more than the preset number of times but the preset condition is still not met, where the second preset incremental angle is greater than the first preset incremental angle.

In another optional implementation, the secondary winding set comprises a first winding pair and a second winding pair, the first winding pair comprises a first secondary winding and a second secondary winding, output terminals of both the first secondary winding and the second secondary winding are connected to input terminals of a first power conversion unit, the second winding pair comprises a third secondary winding and a fourth secondary winding, output terminals of the third secondary winding and the fourth secondary winding are connected to input terminals of a second power conversion unit, and phases of output voltage of the first secondary winding, the third secondary winding, the second secondary winding and the fourth secondary winding are shifted, in the same order, to left or right by 15°.

In another optional implementation, the adjusting the phase shift angle of at least one secondary winding in the secondary winding set includes: adjusting a phase shift angle of the first secondary winding according to a first preset incremental angle; and adjusting a phase shift angle of the second secondary winding according to the first preset incremental angle if the phase shift angle of the first secondary winding has been adjusted according to the first preset incremental angle by more than the preset number of times but a difference between output voltages of the first secondary winding and the second secondary winding still does not meet the preset condition; adjusting a phase shift angle of the third secondary winding according to the first preset incremental angle, and adjusting a phase shift angle of the fourth secondary winding according to the first preset incremental angle if the phase shift angle of the third secondary winding has been adjusted according to the first preset incremental angle by more than the preset number of times but a difference between output voltages of the third secondary winding and the fourth secondary winding still does not meet the preset condition.

In another optional implementation, the adjusting the phase shift angle of at least one secondary winding in each secondary winding set further includes: adding a second preset incremental angle to initial phase shift angles of the first secondary winding, the second secondary winding, the third secondary winding and the fourth secondary winding if the phase shift angles of the first secondary winding and the second secondary winding have been adjusted according to the first preset incremental angle by more than the preset number of times but the difference between output voltages of the first secondary winding and the second secondary winding does not meet the preset condition, or if the phase shift angles of the third secondary winding and the fourth secondary winding have been adjusted according to the first preset incremental angle by more than the preset number of times but the difference between output voltages of the third secondary winding and the fourth secondary winding does not meet the preset condition.

In another optional implementation, the preset threshold is 1.5V, the first preset incremental angle is 0.1°, the second preset incremental angle is 1°, and the preset number of times is 10.

In a second aspect, the present disclosure provides a device comprising a processor configured to implement the method according to the first aspect and various implementations thereof.

In a third aspect, the present disclosure provides a non-transitory computer readable storage medium, storing thereon computer-executable instructions which, when being executed by a processor, enables the processor to implement the design method according to the first aspect and various implementations thereof.

DESCRIPTION OF EMBODIMENTS

In order to make the purpose, technical solutions and advantages of the embodiments of the present disclosure clearer, the technical solutions of the embodiments of the present disclosure will be described clearly and completely in conjunction with the accompanying drawings of the embodiments of the present disclosure.

Existing centralized high-power electric vehicle charging systems include an isolation transformer and n AC/DC charging modules. The isolation transformer converts a three-phase AC voltage of 10 kV from grid to a three-phase AC voltage of 380V. The three-phase AC voltage of 380V is input to the n AC/DC charging modules. The AC/DC charging module is a power conversion unit. Each AC/DC charging module includes a power factor correction (PFC) pulse width modulation (PWM) rectifier circuit and an isolated DC/DC converter.

Another kind of centralized high-power electric vehicle charging system includes a multi-pulse transformer and n AC/DC charging modules. In this charging system, a primary winding of the multi-pulse transformer is connected to the grid, and a plurality of secondary windings of the multi-pulse transformer are respectively connected to the AC/DC charging module. The AC/DC charging module includes an uncontrolled rectifier and a non-isolated DC/DC converter. The multi-pulse transformer can be a 12-pulse transformer, a 24-pulse transformer, a 36-pulse transformer, a 48-pulse transformer or the like.

Figure 1:
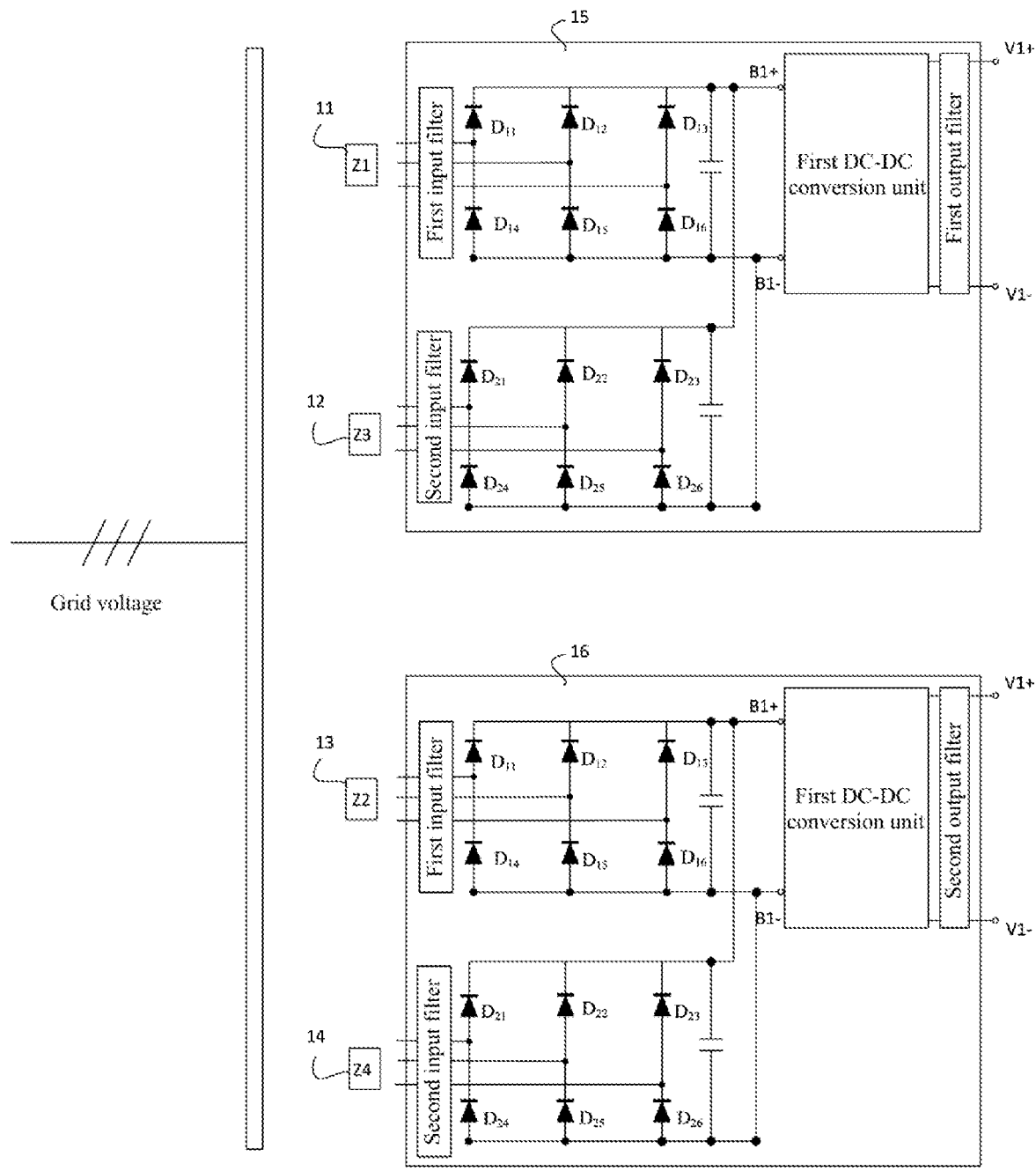
FIG. 1 is a rectification recharging system based on a 12-pulse transformer provided by the present disclosure.

FIG. 1 is a rectification charging system with a 12-pulse transformer provided by the present disclosure. Two secondary windings of the 12-pulse transformer are connected to one power conversion unit. As shown in FIG. 1, the first secondary winding Z1 and the second secondary winding Z3 are electrically connected to the first power conversion unit 15, and the third secondary winding Z2 and the fourth secondary winding Z4 are electrically connected to the second power conversion unit 16. The first power conversion unit 15 includes a first input filter, a second input filter, a first rectifier, a second rectifier, a first DC-DC converter and a first output filter. The first input filter, the second input filter and the first output filter can further reduce harmonics. The first rectifier includes six diodes $D_{11}$, $D_{12}$, $D_{13}$, $D_{14}$, $D_{15}$, and $D_{16}$. The second rectifier includes six diodes $D_{21}$, $D_{22}$, $D_{23}$, $D_{24}$, $D_{25}$, and $D_{26}$. The output terminal of the first secondary winding Z1 is electrically connected to the input terminal of the first rectifier through the first input filter, the output terminal of the second secondary winding Z3 is electrically connected to the input terminal of the second rectifier through the second input filter, the output terminals of the first rectifier and the second rectifier are connected in parallel to form first ports B1+ and B1−. The first ports B1+ and B1− are electrically connected to input terminal of the first DC-DC converter. Output terminals of the first DC-DC converter are electrically connected to or used as the first power supply terminals V1+ and V1−. A first output filter may also be provided between the first DC-DC converter and the first power supply terminals V1+ and V1−.

In addition, the output terminal of the third secondary winding Z2 and the output terminal of the fourth secondary winding Z4 are electrically connected to the second power conversion unit 16. The second power conversion unit 16 is electrically connected to or forms second power supply terminals V1+ and V1−. The structure of the second power conversion unit 16 is similar to that of the first power conversion unit 15, which will not be repeated here.

The phase shift angle of the first secondary winding Z1 differs from that of the second secondary winding Z3 by 30°. The phase shift angle of the third secondary winding Z2 differs from that of the fourth secondary winding Z4 by 30°.

Figure 2:
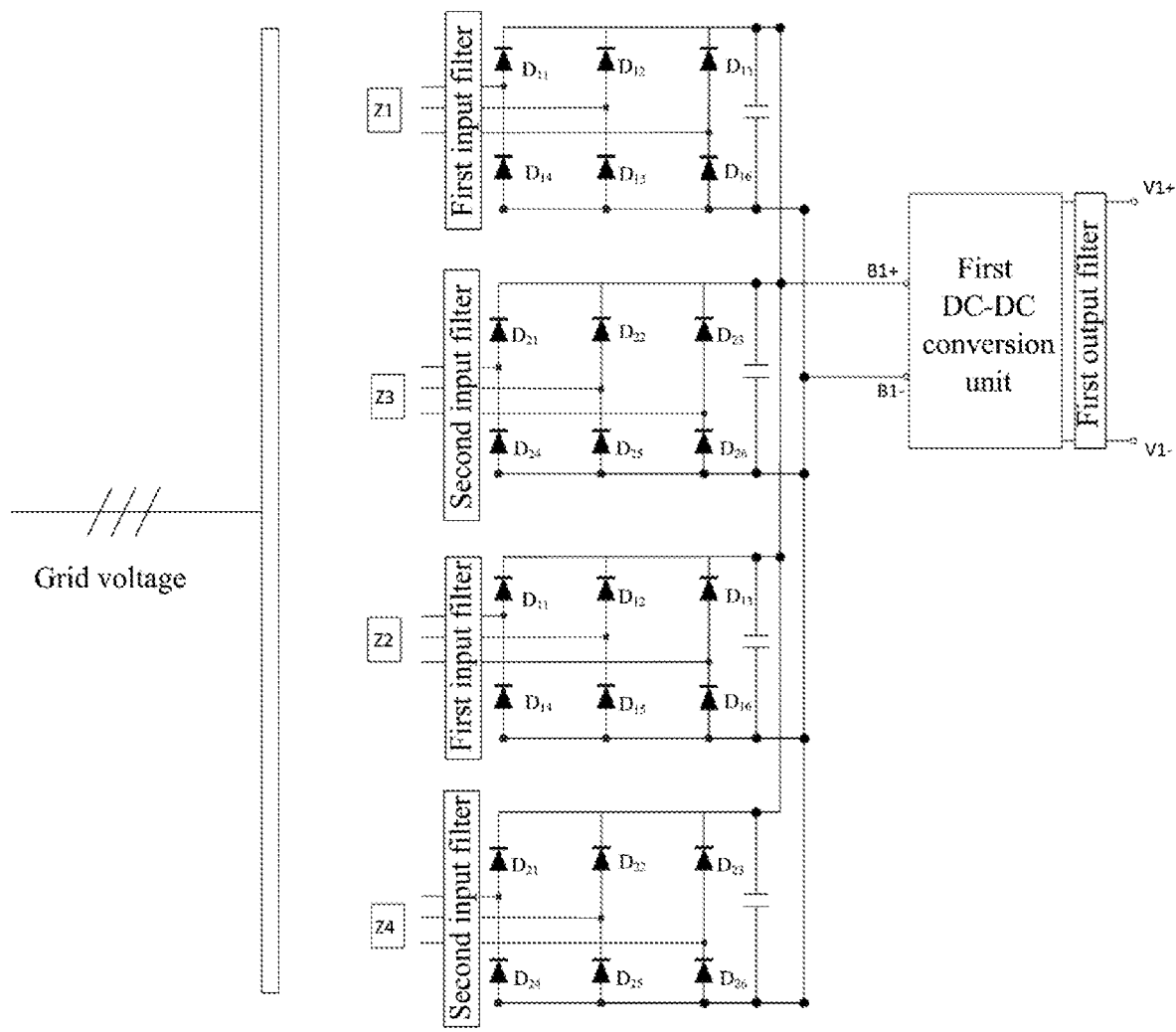
FIG. 2 is a rectification recharging system based on a 24-pulse transformer provided by the present disclosure.

FIG. 2 is another rectification charging system with a 24-pulse transformer provided by the present disclosure. Four secondary windings of the 24-pulse transformer are electrically connected to one power conversion unit. As shown in FIG. 2, output terminals of the four secondary windings Z1, Z3, Z2, and Z4 of the 24-pulse transformer are respectively electrically connected to corresponding rectifier. The outputs of the four rectifiers are connected in parallel, thereby forming ports B1+ and B1−. The ports B1+ and B1− are electrically connected to a DC-DC converter. An output of the DC-DC converter is electrically connected to or forms the power supply terminals V1+ and V1−.

Similarly, in rectification charging system with a 36-pulse transformer, six secondary windings of the 36-pulse transformer are electrically connected to one power conversion unit, thereby realising 36-pulse rectification charging. In rectification charging system with a 48-pulse transformer, eight secondary windings of the 48-pulse transformer are electrically connected to one power conversion unit, thereby realising 36-pulse rectification charging. The structure of the rectification charging system with the 36-pulse transformer or the 48-pulse transformer is similar to that of the rectification charging system shown in FIG. 2, and will not be repeated here.

However, in the above multi-pulse rectification charging systems, the number of turns of the secondary windings of the multi-pulse transformer are rounded, so the output voltages of the secondary windings are unequal. As a result, the uneven input currents may flow into the rectifier bridge arms, which will raised the current stress of diodes in the rectifier bridge arm. As the current stress is raised, the devices of the rectifier have to leave sufficient allowance, which is unfavorable for the design of the rectifier and the selection of capacitors restraining ripple current.

Figure 3:
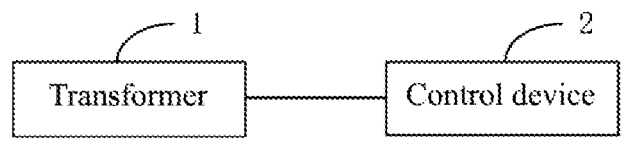
FIG. 3 is a schematic diagram of an application scenario provided by the present disclosure.

FIG. 3 is a schematic diagram of an application scenario provided by the present disclosure. As shown in FIG. 3, in the application scenarios, a transformer 1 and a control device 2 are provided. The transformer 1 may be the multi-pulse transformer shown in FIG. 1 or FIG. 2, or may be other transformers. The control device 2 is used to implement the design methods of the following embodiments to determine the number of turns of the secondary winding of the transformer 1.

It should be noted that the transformer in this embodiment includes at least one secondary winding set arranged on a secondary side, and each secondary winding set includes a plurality of secondary windings. Output terminals of the secondary windings in each secondary winding set are respectively connected to corresponding input terminal of a power conversion unit.

For example, the transformer can be shown in FIG. 1, the 12-pulse transformer includes two secondary winding sets, and each secondary winding set includes two secondary windings, such as the secondary windings Z1 and Z3. The output terminals of the secondary windings Z1 and Z3 are electrically connected to the input terminals of the power conversion unit 15. The transformer can also be the 24-pulse transformer shown In FIG. 2, the 24-pulse transformer includes one secondary winding set, and the secondary winding set includes four secondary windings. The output terminals of the four secondary windings Z1, Z3, Z2 and Z4 are connected to the corresponding input terminal of the power conversion unit.

Figure 4:
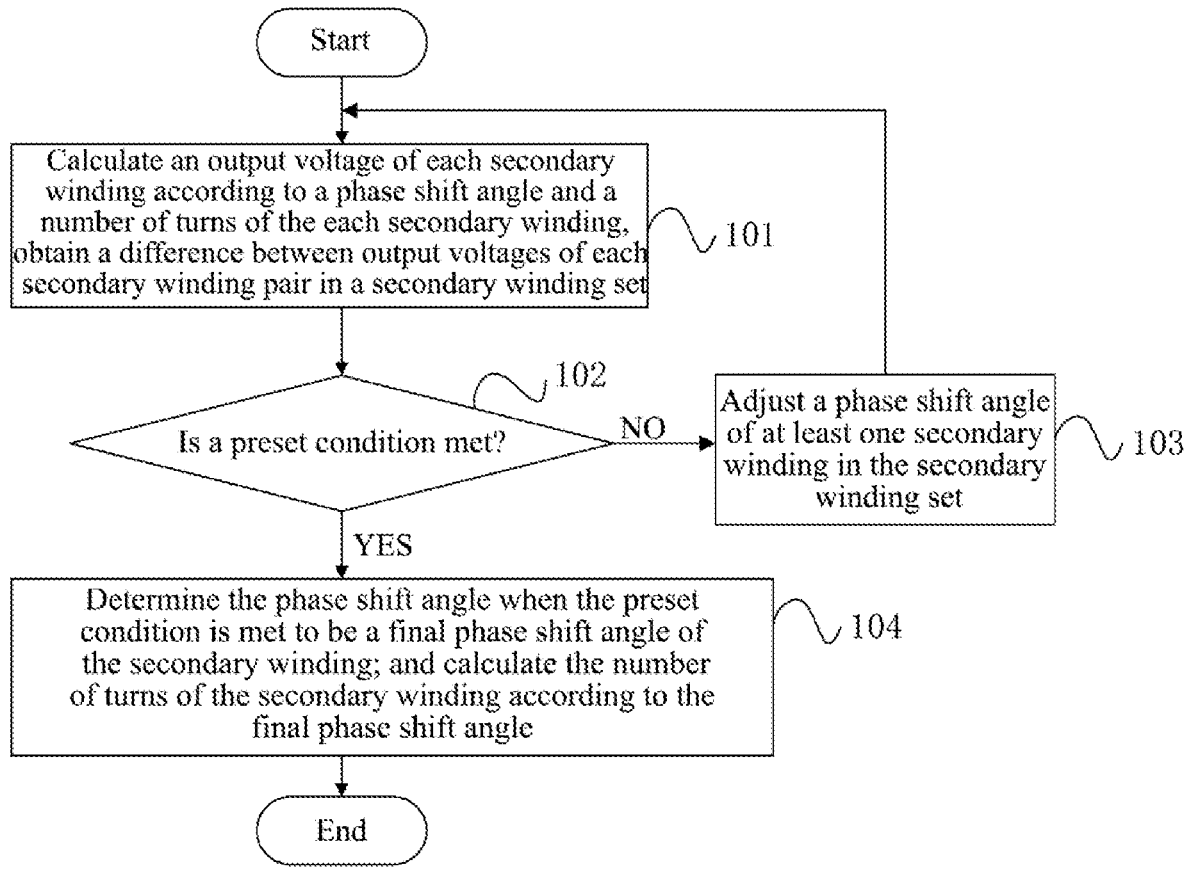
FIG. 4 is a schematic flow chart of a design method of a transformer provided by the present disclosure.

FIG. 4 is a schematic flow chart of a design method of a transformer provided by the present disclosure. As shown in FIG. 4, the design method of the transformer includes following steps.

Step 101, calculating an output voltage of each secondary winding according to a phase shift angle and a number of turns of the each secondary winding, and obtaining a difference between output voltages of each secondary winding pair in a secondary winding set.

Specifically, a theoretical number of turns for each secondary winding is calculated according to transformer parameters and the phase shift angle of the corresponding secondary winding; the theoretical number of turns of the each secondary winding is rounded to obtain an actual number of turns of the each secondary winding; the output voltage of the each secondary winding is calculated according to the transformer parameters and the actual number of turns of the corresponding secondary winding; and the differences between the output voltages of the secondary winding pairs are obtained according to the output voltages of the secondary windings.

A number of turns of the primary winding can be selected according to predetermined transformer parameters, such as transformer capacity, input voltage, output voltage, current density. The theoretical number of turns of the secondary winding is then calculated according to the transformer parameters, the number of turns of the primary winding and the phase shift angle of the secondary winding. For example, a theoretical number of turns may be 24.3 turns. However, considering that the actual number of turns must not be a decimal fraction, so the theoretical number of turns will be rounded to obtain the actual number of turns, such as 24 turns. The output voltage of the secondary winding can be then calculated according to the transformer parameters and the actual number of turns of the secondary winding, and the differences between the output voltages of the secondary winding pair in the secondary winding set can be finally determined.

For example, in FIG. 1, the 12-pulse transformer includes two secondary winding sets, and each of the two secondary winding sets includes one secondary winding pair, such as the secondary winding pair (Z1, Z3) or the secondary winding pair (Z2, Z4). For one secondary winding set, the output voltage of the secondary winding Z1 can be calculated according to the phase shift angle and the number of turns of the secondary winding Z1, the output voltage of the secondary winding Z3 can be calculated according to the phase shift angle and the number of turns of the secondary winding Z3, and then the difference between the output voltages of the secondary winding pair (Z1, Z3) can be obtained. The difference between the output voltages of the secondary winding pair (Z1, Z3) is obtained by subtracting the output voltage of the secondary winding Z1 from the output voltage of the secondary winding Z3, or obtained by subtracting the output voltage of the secondary winding Z3 from the output voltage of the secondary winding Z1. For the other secondary winding set, the output voltages of the secondary windings Z2 and Z4 is similarly calculated, and the difference between the output voltages of the secondary winding pair (Z2, Z4) is similarly obtained. It should be noted that the formula for calculating the output voltage of the secondary winding belongs to prior art, which is well-known by a person of ordinary skill in the art.

In FIG. 2, the 24-pulse transformer includes four secondary windings Z1, Z2, Z3 and Z4, and the four secondary windings Z1, Z2, Z3 and Z4 are electrically connected to one power conversion unit and form one secondary winding set. In the secondary winding set, there are six secondary winding pairs, which are the secondary winding pairs (Z1, Z2), (Z1, Z3), (Z1, Z4), (Z2, Z3), (Z2, Z4), and (Z3, Z4). The output voltages of the secondary windings Z1, Z2, Z3 and Z4 can be calculated respectively according to the phase shift angles and the numbers of turns of the secondary windings Z1, Z, Z3, Z4, and then the differences between the output voltages of each secondary winding pair can be obtained.

Step 102, determining whether a preset condition is met.

The preset condition is that the difference between the output voltages of the each secondary winding pair in the secondary winding set is less than or equal to a preset threshold.

If the preset condition is met, step 104 is executed, and the process ends. If not, step 103 is executed.

Specifically, those skilled in the art can set different preset thresholds according to different application scenarios. For example, for the multi-pulse transformer in FIG. 1, there are following requirements for the secondary winding set:
 (1) The output voltage error of single secondary winding is within the range of −5%-5%;
 (2) The differences between the output voltages of the secondary windings whose phase shift angles differ by 30° is less than 1.5V;
 (3) The short-circuit impedance is in the range of 2%-10%.

For another example, for the multi-pulse transformer in FIG. 2, there are following requirements for the secondary winding set:
 (1) The output voltage error of single secondary winding is within the range of −5%-5%;
 (2) The difference between the output voltages of any two secondary windings is less than 1.5V;
 (3) The short-circuit impedance is in the range of 2%-10%.

In some embodiment, the preset threshold is 1.5V, that is, the differences between the output voltages of the each secondary winding pair in the secondary winding set is less than 1.5V. Specifically, the differences between the output voltages of the secondary windings connected to the same charging module (power conversion unit) are less than 1.5V. For example, in FIG. 1, the difference between the output voltages of the first secondary winding Z1 and the second secondary winding Z3 is less than 1.5V, and the difference between the output voltages of the third secondary winding Z2 and the fourth secondary winding Z4 is less than 1.5V.

For another example, in FIG. 2, the difference between the output voltages of the first secondary winding Z1 and the second secondary winding Z3 is less than 1.5V, the difference between the output voltages of the first secondary winding Z1 and the third secondary winding Z2 is less than 1.5V, the difference between the output voltages of the first secondary winding Z1 and the fourth secondary winding Z4 is less than 1.5V, the difference between the output voltages of the second secondary winding Z3 and the third secondary winding Z2 is less than 1.5V, the difference between the output voltages of the second secondary winding Z3 and the fourth secondary winding Z4 is less than 1.5V, and the difference between the output voltages of the third secondary winding Z3 and the fourth secondary winding Z4 is less than 1.5V.

Step 103, adjusting a phase shift angle of at least one secondary winding in the secondary winding set, and then repeating steps 101 and 102 until the preset condition is met.

For example, for the 12-pulse transformer shown in FIG. 1, the phase shift angles of the secondary windings Z1 and/or Z3 can be adjusted. Then the step 101 is executed again, so the output voltages of the secondary windings Z1 and/or Z3 are calculated according to the adjusted phase shift angles. The difference between the output voltages of the secondary windings Z1 and Z3 can be calculated. If the difference between the output voltages of Z1 and Z3 meets the preset condition, step 104 is executed; if not, the phase shift angles of the secondary windings Z1 and/or Z3 are then adjusted until the difference between the output voltages of Z1 and Z3 meets the preset condition.

For the 24-pulse transformer shown in FIG. 2, the phase shift angles of one or more of the secondary windings Z1, Z2, Z3 and Z4 can be adjusted. Then the step 101 is executed again, so the output voltages of the secondary windings are calculated according to the adjusted phase shift angles. The difference between the output voltages of the each secondary winding pair can be calculated. If the differences between the output voltages of all the secondary winding pairs meet the preset condition, the step 104 is executed; if not, the phase shift angles of one or more of the secondary windings Z1, Z2, Z3 and Z4 are then adjusted until the differences between the output voltages of all the secondary winding pairs meet the preset condition.

In some embodiments, the step 103 includes: adjusting the phase shift angle of the i-th secondary winding in the secondary winding set according to the first preset incremental angle, and i is greater than or equal to 1. If the phase shift angle of the i-th secondary winding has been adjusted according to the first preset incremental angle by more than a preset number of times but the preset condition is still not met, adjust the phase shift angle of the (i+1)-th secondary winding in the secondary winding set according to the first preset incremental angle.

In some embodiments, the step 103 further includes: if phase shift angles of all secondary windings in the secondary winding set have been adjusted according to the first preset incremental angle by more than the preset number of times but the preset condition is still not met, adjust the phase shift angles of all secondary windings in the secondary winding set according to a second preset incremental angle, and repeat the step of adjusting the phase shift angle of at least one secondary winding in each secondary winding set. The second preset incremental angle is greater than the first preset incremental angle.

Specifically, the phase shift angle of the i-th secondary winding in the secondary winding set can be initially fine-tuned. For example, the first preset incremental angle is 0.1°.

Every time the phase shift angle of the i-th secondary winding in the secondary winding set is adjusted according to the first preset incremental angle, the differences between the output voltages of the secondary winding pairs in the secondary winding set are calculated. When the phase shift angle of the i-th secondary winding is adjusted continuously from one to the preset number of times and the preset condition in the step 102 is still not met, the phase shift angle of the (i+1)-th secondary winding in the secondary winding set starts to be adjusted according to the first preset incremental angle. For example, the preset number of times can be 10 times. When all the secondary windings in the secondary winding set have been adjusted by the preset number of times and the preset condition is still not met, the phase shift angles of all secondary windings in the secondary winding set can be adjusted by the second preset incremental angle. For example, the second preset incremental angle is 1°.

The first preset incremental angle is small, such as 0.1. The phase shift angles of the secondary windings in the secondary winding set are adjusted by 0.1 each time. When the numbers of times all the secondary windings in the secondary winding set adjusted has reached the preset value, such as 10, and the preset condition in the step 102 is still not met, all the secondary windings can be adjusted by the second preset incremental angle. Compared with the first preset incremental angle, the second preset incremental angle is large, such as 1°. As used herein, the process of adjusting according to the first preset increment angle can be called the adjustment iteration inner loop, and the process of adjusting according to the second preset increment angle can be called adjustment iteration outer loop. In this embodiment, the adjustment iteration inner loop is first entered to adjust the phase shift angles of the secondary windings, and then the adjustment iteration outer loop is entered if the preset condition is not met. In the present disclosure, the adjustment iteration inner loop and the adjustment iteration outer loop are provided to ensure the differences between the phase shift angles of the secondary windings are kept around a set value. For example, in FIG. 1, the differences between the phase shift angles of the secondary windings Z1 and Z3 are kept at around 30°, and in FIG. 2, the differences between the phase shift angles of the secondary windings Z1 and Z3 are kept at around 15°.

Optionally, the first preset incremental angle is 0.1°, the second preset incremental angle is 1°, and the preset number of times is 10.

In one embodiment, the 12-pulse transformer shown in FIG. 1 is designed. Take the secondary winding set (Z1 Z3) as an example to explain the design method of the present disclosure.

(1) Select the number of turns for the primary winding of the 12-pulse transformer according to the predetermined transformer parameters (transformer capacity, input voltage, output voltage and current density);

(2) Initialize the phase shift angles of the secondary windings Z1 and Z3: set the initial value of the phase shift angle of Z1 to 0°, and the initial value of the phase shift angle of Z3 to 30°;

(3) Calculate the theoretical number of turns of the secondary windings Z1 and Z3 according to the transformer parameters, the initialized phase shift angles of the secondary windings Z1 and Z3, and the number of turns of the primary winding;

(4) Round the theoretical number of turns of the secondary windings Z1 and Z3 to obtain the actual number of turns of the secondary windings Z1 and Z3;

(5) Calculate the output voltages of Z1 and Z3 according to the actual number of turns of the secondary windings Z1 and Z3, and obtain the difference between the output voltages of Z1 and Z3;

(6) Determine whether the difference between the output voltages of Z1 and Z3 is less than or equal to 1.5V;

(7) If the difference between the output voltages of Z1 and Z3 is not less than or equal to 1.5V, add 0.1° to the initial value of the phase shift angle of Z1. Calculate the theoretical number of turns of the secondary windings Z1 and Z3 according to the transformer parameters and the phase shift angles adjusted, round the result to obtain the actual number of turns of the secondary windings Z1 and Z3. Determine whether the voltage difference between Z1 and Z3 is less than or equal to 1.5V and, if yes, end; if not, continuously add 0.1° to the phase shift angle of Z1 and repeat the calculation. The phase shift angle of Z1 can be adjusted at most 10 times. During the 10 adjustments, the phase shift angle of Z1 is respectively equal to 0.1°, 0.2°, 0.3°, 0.4°, 0.5°, 0.6°, 0.7°, 0.8°, 0.9° and 1°, and the phase shift angle of Z2 keeps at 30°. If the voltage difference between Z1 and Z3 is still not less than or equal to 1.5V after 10 adjustments of the phase shift angle of Z1, adjust the initial value of the phase shift angle of Z3 by 0.1°. The phase shift angle of Z1 can be adjusted at most 10 times. During the adjustment iteration inner loop, many data groups for the phase shift angles of Z1 and Z2 are got. For example, the phase shift angle of Z1 is respectively equal to 0.1°, 0.2°, 0.3°, 0.4°, 0.5°, 0.6°, 0.7°, 0.8°, 0.9° and 1°, and the phase shift angle of Z2 keeps at 30°; the phase shift angle of Z1 is respectively equal to 0.1°, 0.2°, 0.3°, 0.4°, 0.5°, 0.6°, 0.7°, 0.8°, 0.9° and 1°, and the phase shift angle of Z2 keeps at 30.1° . . . the phase shift angle of Z1 is respectively equal to 0.1°, 0.2°, 0.3°, 0.4°, 0.5°, 0.6°, 0.7°, 0.8°, 0.9° and 1°, and the phase shift angle of Z2 keeps at 31°. When the voltage difference between Z1 and Z3 calculated according to current data group is less than or equal to 1.5V, the current data group is the finally phase shift angles of Z1 and Z2, and the process of adjusting the phase shift angles ends. When all the data groups have been used and the voltage difference between Z1 but Z3 is still not less than or equal to 1.5V, the adjustment iteration inner loop ends and the adjustment iteration outer loop begins. During the adjustment iteration outer loop, add 1° to the initial values of the phase shift angles of both Z1 and Z3, so the phase shift angle of Z1 is equal to 1°, and the phase shift angle of Z2 is equal to 31°. When the voltage difference between Z1 and Z3 calculated according to the current data group (1°, 31°) is not less than or equal to 1.5V, continue adjusting Z1 by increments of 0.1°. At this time, the initial values of the phase shift angle of Z1 and Z3 are respectively updated to 1° and 31°.

In another embodiment, the 24-pulse transformer shown in FIG. 2 is designed. The adjustment of the 24-pulse transformer shown in FIG. 2 is similar to that of the 12-pulse transformer. First, enter the adjustment iteration inner loop, that is, separately adjust Z1, Z2, Z3 and Z4 by 0.1°, and determine whether the difference between output voltages of any two secondary windings (i.e., Z1 and Z2, Z1 and Z3, Z1 and Z4, Z2 and Z3, Z2 and Z4, Z3 and Z4) is less than or equal to 1.5V. If the condition that the voltage differences are less than or equal to 1.5V is still not met after 10 adjustments, enter the adjustment iteration outer loop, that is, add 1° to the initial phase shift angles of Z1, Z2, Z3 and Z4, and then enter the adjustment iteration inner loop until the preset condition is met. The 36-pulse transformer, the 48-pulse transformer, etc. can be adjusted in the same way as this embodiment.

Step 104, determining the phase shift angle when the preset condition is met to be a final phase shift angle of the secondary winding; and calculate the number of turns of the secondary winding according to the final phase shift angle.

Specifically, it can be determined that the phase shift angle when the preset condition is met is the final phase shift angle for the secondary winding. Calculate the final theoretical number of turns of the secondary winding according to the transformer parameters, the final phase shift angle of the secondary winding, and the number of turns of the primary winding. Round the final theoretical number of turns of the secondary winding to obtain the number of turns of the secondary winding. Thus, the secondary winding of the transformer can be made according to the number of turns of the secondary winding finally obtained.

The present disclosure obtains, by iteratively adjusting the phase shift angles of the secondary windings of the transformer, the number of turns of the secondary winding meeting the preset condition, thereby solving the technical problem of excessive voltage difference caused by rounding the number of turns of the secondary winding of the transformer, realizing voltage stabilization and even currents for the input rectifier bridge arms while effectively reducing the dimension and cost of the recharging system.

In view of the above problems, the technical idea of the present disclosure lies in, iteratively adjust a phase shift angle of a secondary winding of a transformer to obtain a number of turns of the secondary winding corresponding to a condition where differences between output voltages of secondary winding pairs are less than a preset threshold, and adjusts the number of turns of the secondary winding of the transformer according to the determined number of turns, thereby realizing voltage stabilization and even currents, and reducing the dimension and cost of the recharging system without adding a balancing reactor.

Figure 5A:
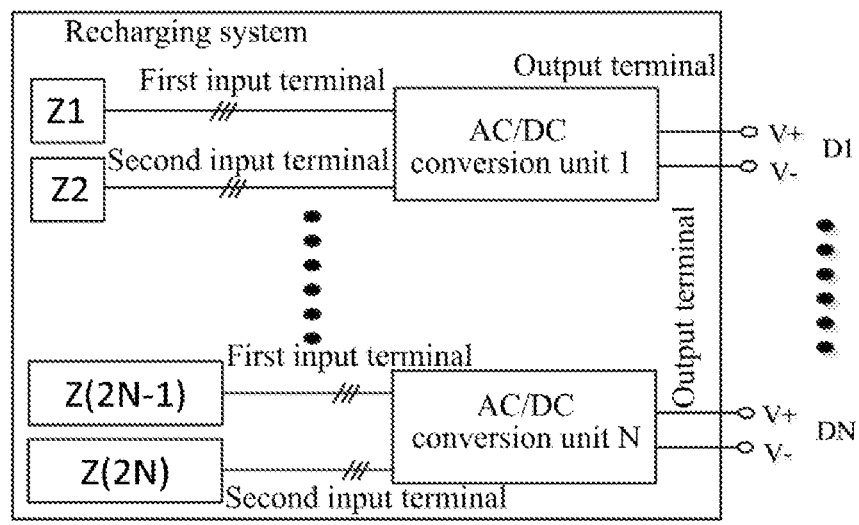
FIG. 5A is another rectification recharging system based on a multi-pulse transformer provided by the present disclosure.

FIG. 5A is another rectification recharging system based on a multi-pulse transformer provided by the present disclosure. As shown in FIG. 5A, the secondary winding set includes N winding pairs, and each winding pair includes a first secondary winding and a second secondary winding. The recharging system also includes N AC-DC conversion units and N power supply terminals, where N is a positive integer greater than or equal to 2. It should be noted that, although only one secondary winding set is shown in FIG. 5A, there are a primary winding and multiple secondary winding sets in reality. The structures of the secondary winding sets are essentially the same, and only one secondary winding set had been shown in the figure for the sole purpose of structural simplicity.

Among the N winding pairs shown in FIG. 5A, the first winding pair (corresponding to the top winding pair in FIG. 5A) includes the first secondary winding Z1 and the second secondary winding Z2, and the N-th winding pair (corresponding to the bottom winding pair in FIG. 5A) includes the first secondary winding Z(2N−1) and the second secondary winding Z(2N). The N AC-DC conversion units correspond to the N winding pairs, respectively. Each of the AC-DC conversion units includes a first input terminal, a second input terminal, and an output terminal. The first input terminal is connected to a corresponding first secondary winding, and the second input terminal is connected to a corresponding second secondary winding. As shown in FIG. 5A, the AC-DC conversion unit 1 is connected to the first winding pair. Specifically, the first input terminal of the AC-DC conversion unit 1 is electrically connected to the first secondary winding Z1, and the second input terminal is electrically connected to the second secondary winding Z2. The AC-DC conversion unit N is connected to the N-th winding pair. Specifically, the first input terminal of the AC-DC conversion unit N is connected to the first secondary winding Z(2N−1), and the second input terminal is connected to the second secondary winding Z(2N). The N power supply terminals correspond to the N AC-DC conversion units, respectively, and each power supply terminal is connected to a corresponding output terminal. As shown in FIG. 5A, the AC-DC conversion unit 1 corresponds to the power supply terminal D1. Specifically, the output terminal of the AC-DC conversion unit 1 is electrically connected to the power supply terminal D1 or directly forms the power supply terminal D1. The AC-DC conversion unit N corresponds to the power supply terminal DN. Specifically, the output terminal of the AC-DC conversion unit N is electrically connected to the power supply terminal DN or directly forms the power supply terminal DN.

In one winding pair, the difference between phase shift angles of the first secondary winding and the second secondary winding is 30° (for example, the difference between phase shift angles of the first secondary winding Z1 and the second secondary winding Z2 is 30°), the difference between phase shift angles of the first secondary windings in adjacent winding pairs is 360°/12N, and the difference between phase shift angles of the second secondary windings in adjacent winding pairs is 360°/12N.

When N power supply terminals are connected to recharging devices at the same time, 12N pulse rectification recharging is performed. It can be understood that the power supply device forms a 12N pulse rectification recharging structure when all the N power supply terminals are in working mode.

For the specific structure of the AC-DC conversion unit, reference may be made to the first power conversion unit 15 shown in FIG. 1, which will not be repeated herein.

Figure 6:
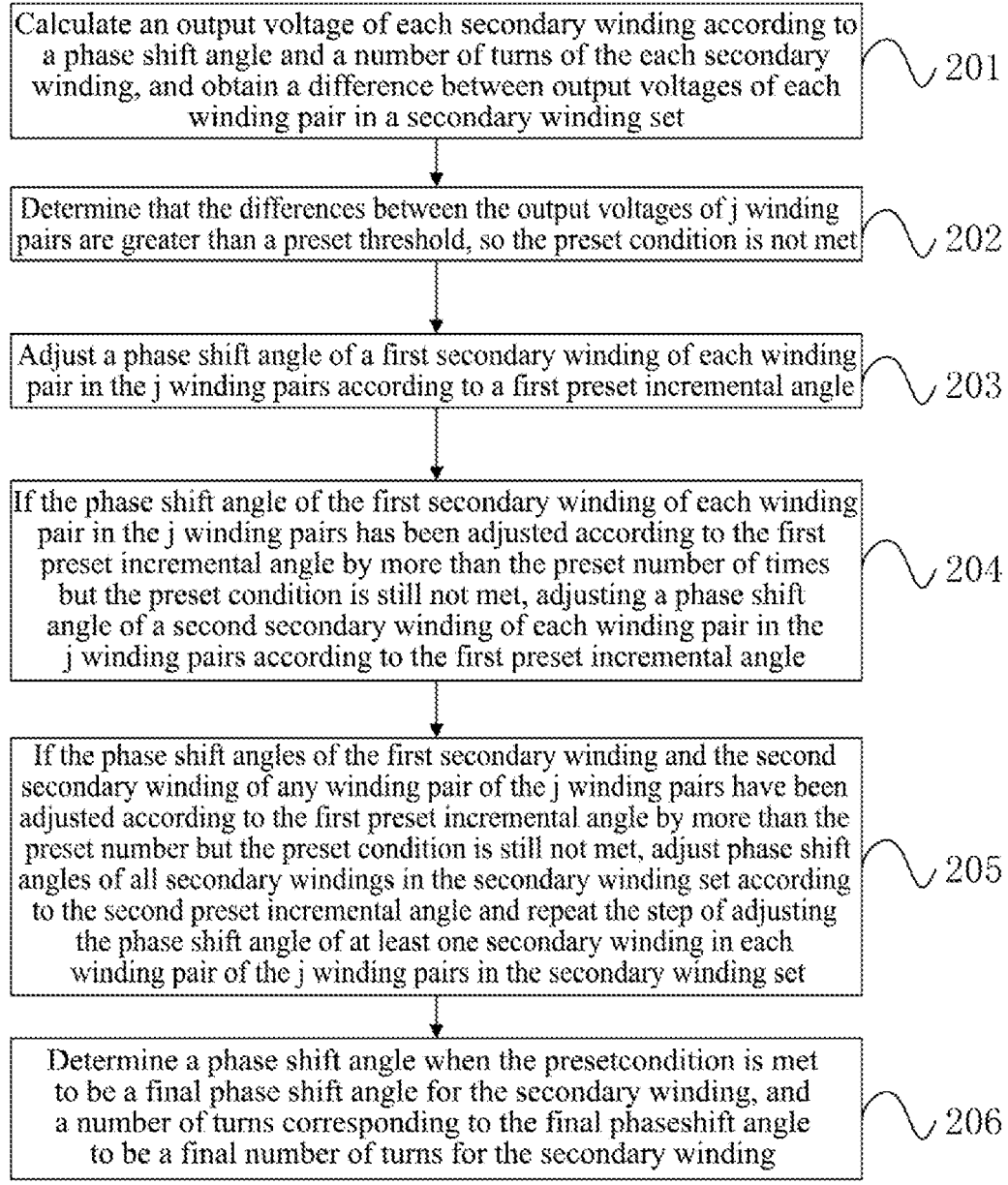
FIG. 6 is a schematic flow chart of a design method of a transformer in FIG. 5.

FIG. 6 is a schematic flow chart of a design method of the transformer in FIG. 5A.

As shown in FIG. 6, the design method of the transformer includes:

Step 201, calculating an output voltage of each secondary winding according to a phase shift angle and a number of turns of the each secondary winding, and obtaining a difference between output voltages of each winding pair in a secondary winding set.

Specifically, a theoretical number of turns for each secondary winding is calculated according to transformer parameters and the phase shift angle of the corresponding secondary winding; the theoretical number of turns of the each secondary winding is rounded to obtain an actual number of turns of the each secondary winding. The output voltage of the first secondary winding is calculated according to the transformer parameters and the actual number of turns of the first secondary winding; the output voltage of the second secondary winding is calculated according to the transformer parameters and the actual number of turns of the second secondary winding; and the differences between the output voltages of the winding pairs are obtained according to the output voltages of the first secondary winding and the second secondary winding.

Step 202, determining that the differences between the output voltages of j winding pairs are greater than a preset threshold, so the preset condition is not met.

As used herein, $1 \leq j \leq N$.

Specifically, it can be determined whether the differences between output voltages of the N winding pairs meet the preset condition. The preset condition is that the difference between the output voltages of the each winding pair in the secondary winding set is less than or equal to a preset threshold. If the preset condition is met, step 206 is executed. If it is determined that the differences between the output voltages of the j winding pairs are greater than the preset threshold, the preset condition is not met, and step 203 is executed.

Step 203, adjusting a phase shift angle of a first secondary winding of each winding pair in the j winding pairs according to a first preset incremental angle.

Step 204, if the phase shift angle of the first secondary winding of each winding pair in the j winding pairs has been adjusted according to the first preset incremental angle by more than the preset number of times but the preset condition is still not met, adjusting a phase shift angle of a second secondary winding of each winding pair in the j winding pairs according to the first preset incremental angle.

If the phase shift angles of both the first secondary winding and the second secondary winding of any winding pair in the j winding pairs have been adjusted according to the first preset incremental angle by more than the preset number of times but the preset condition is still not met, adjust the phase shift angles of all secondary windings in the secondary winding set according to a second preset incremental angle, and repeat the step of adjusting the phase shift angle of at least one secondary winding in each winding pair of the j winding pairs in the secondary winding set.

Here, the second preset incremental angle is greater than the first preset incremental angle.

Step 206, Determining the phase shift angle when the preset condition is met to be the final phase shift angle of the secondary winding and the number of turns corresponding to the final phase shift angle to be the final number of turns of the secondary winding.

The implementation of step 206 in this embodiment is similar to that of step 104 in the foregoing embodiment, which will not be repeated herein.

In this implementation, each secondary winding set includes N winding pairs, each winding pair includes a first secondary winding and a second secondary winding, and the difference between phase shift angles of the first secondary winding and the second secondary winding is 30°. Each power conversion unit includes two input terminals and one output terminal, and the output terminals of both the first secondary winding and the second secondary winding are electrically connected to the two input terminals of one power conversion unit, respectively, where N is a positive integer. The adjusting the phase shift angle of at least one secondary winding in each secondary winding set includes: determining that differences between output voltages of j winding pairs are greater than the preset threshold and thus the preset condition is not met; adjusting a phase shift angle of a first secondary winding of each winding pair of the j winding pairs according to a first preset incremental angle; if the phase shift angle of the first secondary winding of each winding pair of the j winding pairs has been adjusted according to the first preset incremental angle by more than a preset number of times but the preset condition is still not met, adjusting a phase shift angle of a second secondary winding of each winding pair of the j winding pairs according to the first preset incremental angle, where $1 \leq j \leq N$.

Specifically, only when the differences between output voltages of each of the N winding pairs on the secondary side of the transformer are less than or equal to the preset threshold, the transformer can achieve voltage stabilization and even currents. Therefore, if the difference between the output voltages of at least one winding pair does not meet the preset condition, adjustment of the phase shift angles of the at least one winding pair is required. In this embodiment, adjustment iteration inner loop is first performed on the first secondary winding of the winding pair that does not meet the preset conditions. For example, the phase shift angle is fine-tuned by adding 0.1° degrees, then the output voltages of the first secondary winding and the second secondary winding are obtained, and comparison is made as to whether the voltage difference is less than or equal to 1.5V. If it still does not fulfilled after a preset adjustment times, the phase shift angle of the second secondary winding is adjusted by 0.1°.

As an optional embodiment, the method further includes step 205: if the phase shift angles of both the first secondary winding and the second secondary winding of any winding pair of the j winding pairs have been adjusted according to the first preset incremental angle by more than the preset number but the preset condition is still not met, adjusting phase shift angles of all secondary windings in the secondary winding set according to the second preset incremental angle, and repeating the step of adjusting the phase shift angle of at least one secondary winding in each winding pair of the j winding pairs in the secondary winding set.

Specifically, if the first secondary winding and the second secondary winding have been adjusted by 0.1° for 10 times but the preset condition is still not met, adjust all secondary windings in the N winding pairs by 1° (that is, enter the adjustment iteration outer loop), and then go on with the adjustment s by 0.1° until the preset condition is met.

Windings whose phase shift angles differ by 30° have the minimum harmonics in the output voltage. In the same winding pair, the adjustment iteration inner loop makes the difference between adjusted phase shift angles of the first secondary winding and the second secondary winding to maintain at about 30°. In adjacent winding pairs, the adjustment iteration outer loop makes the difference between phase shift angles of the first secondary windings to maintain at about 360°/12N, and the difference between phase shift angles of the second secondary windings to maintain at 360°/12N.

As an optional embodiment, the secondary winding set comprises a first winding pair and a second winding pair, the first winding pair includes a first secondary winding and a second secondary winding, and output terminals of both the first secondary winding and the second secondary winding are connected to input terminals of a first power conversion unit corresponding to the first winding pair. The second winding pair includes a third secondary winding and a fourth secondary winding, and output terminals of both the third secondary winding and the fourth secondary winding are connected to input terminals of a second power conversion unit corresponding to the second winding pair. Phases of output voltage of the first secondary winding, the third secondary winding, the second secondary winding and the fourth secondary winding are shifted, in the same order, to left or right by 15°. This optional embodiment actually corresponds to the case in FIG. 6 when N is equal to 2, and the rectification recharging system in this case is a 24-pulse rectification recharging system.

The adjusting the phase shift angle of at least one secondary winding in each secondary winding set includes: adjusting the phase shift angle of the first secondary winding in the first winding pair according to the first preset incremental angle, and if the phase shift angle of the first secondary winding has been adjusted according to the first preset incremental angle by more than the preset number of times but the difference between output voltages of the first secondary winding and the second secondary winding still does not meet the preset condition, adjusting the phase shift angle of the second secondary winding in the first winding pair according to the first preset incremental angle; adjusting a phase shift angle of the third secondary winding in the second winding pair according to the first preset incremental angle, and if the phase shift angle of the third secondary winding has been adjusted according to the first preset incremental angle by more than the preset number of times but the difference between output voltages of the third secondary winding and the fourth secondary winding still does not meet the preset condition, adjusting the phase shift angle of the fourth secondary winding in the second winding pair according to the first preset incremental angle.

Figure 5B:
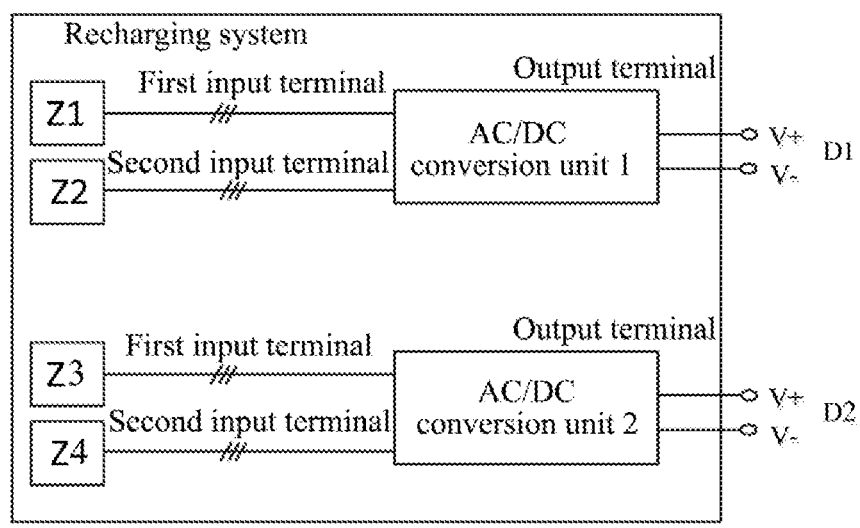
FIG. 5B is an illustrative example of the another rectification recharging system.

FIG. 5B is an illustrative example of the another rectification recharging system. As shown in FIG. 5B, the method further includes: if the phase shift angles of both the first secondary winding and the second secondary winding have been adjusted according to the first preset incremental angle by more than the preset number of times but the difference between output voltages of the first secondary winding and the second secondary winding still do not meet the preset condition, or if the phase shift angles of the third secondary winding and the fourth secondary winding have been adjusted according to the first preset incremental angle by more than the preset number of times but the differences between output voltages of the third secondary winding and the fourth secondary winding do not meet the preset condition, adjusting the phase shift angles of the first secondary winding, the second secondary winding, the third secondary winding and the fourth secondary winding according to a second preset incremental angle, and repeating the step of adjusting the phase shift angle of at least one secondary winding in each secondary winding set.

Specifically, this embodiment has defined a new type of 24-pulse transformer, whose structure is similar to that of the 12-pulse transformer shown in FIG. 1. The difference is that the output voltages of Z1 and Z3 of the 12-pulse transformer differ by 30°, which only requires determining that the difference between the output voltages of Z1 and Z3 meets the preset condition, and the secondary windings Z1 and Z3 and the secondary windings Z2 and Z4 belong to different secondary winding sets. Instead, for the new 24-pulse transformer, Phases of the output voltages of the secondary windings Z1, Z2, Z3 and Z4 differ by 15° in the same order, and the secondary windings Z1, Z2, Z3 and Z4 need to work at the same time and belong to the same secondary winding set.

Figure 7:
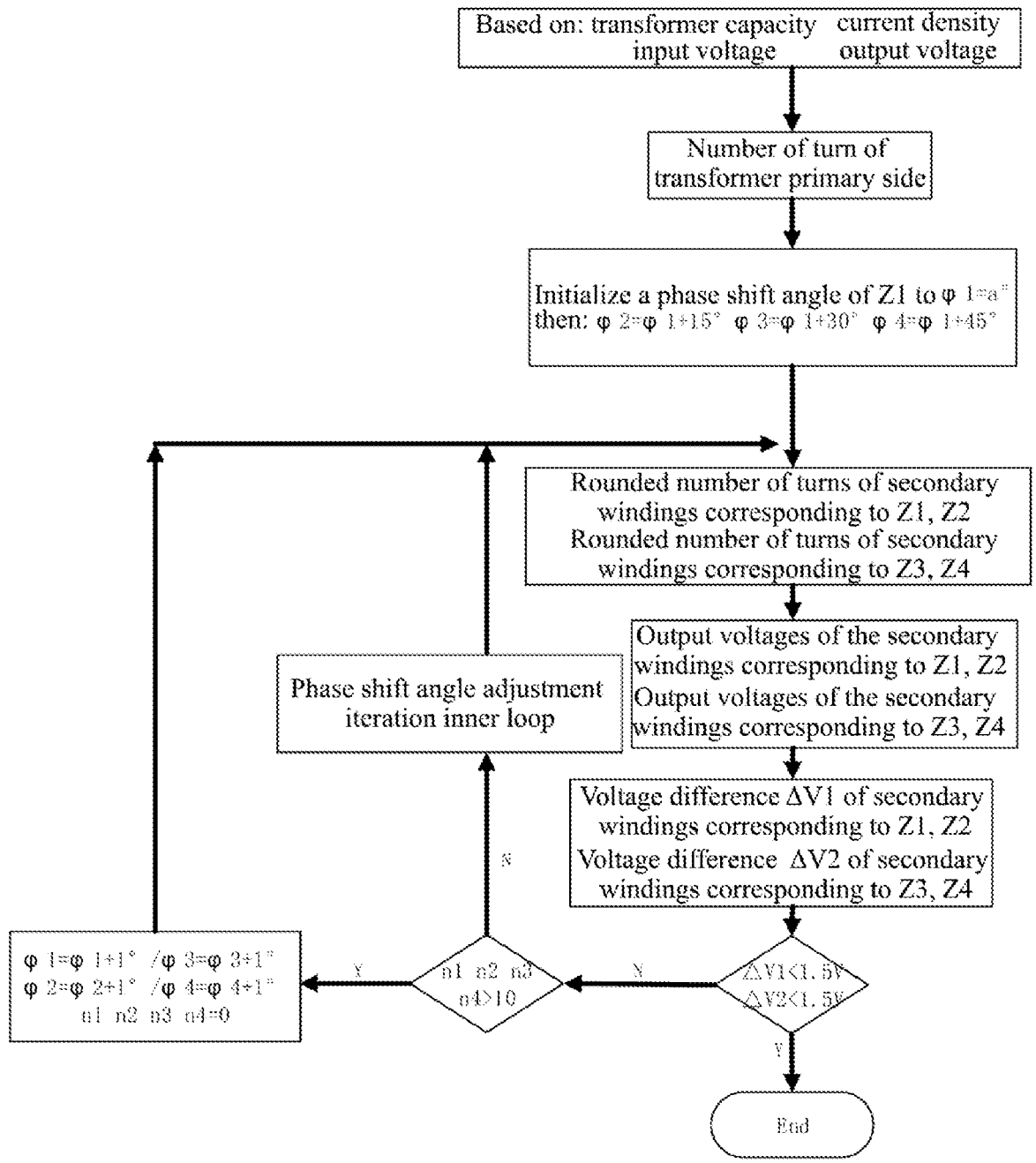
FIG. 7 is a flow chart of the phase shift angle adjustment of a new type of 24-pulse transformer provided by the present disclosure.
Figure 8:
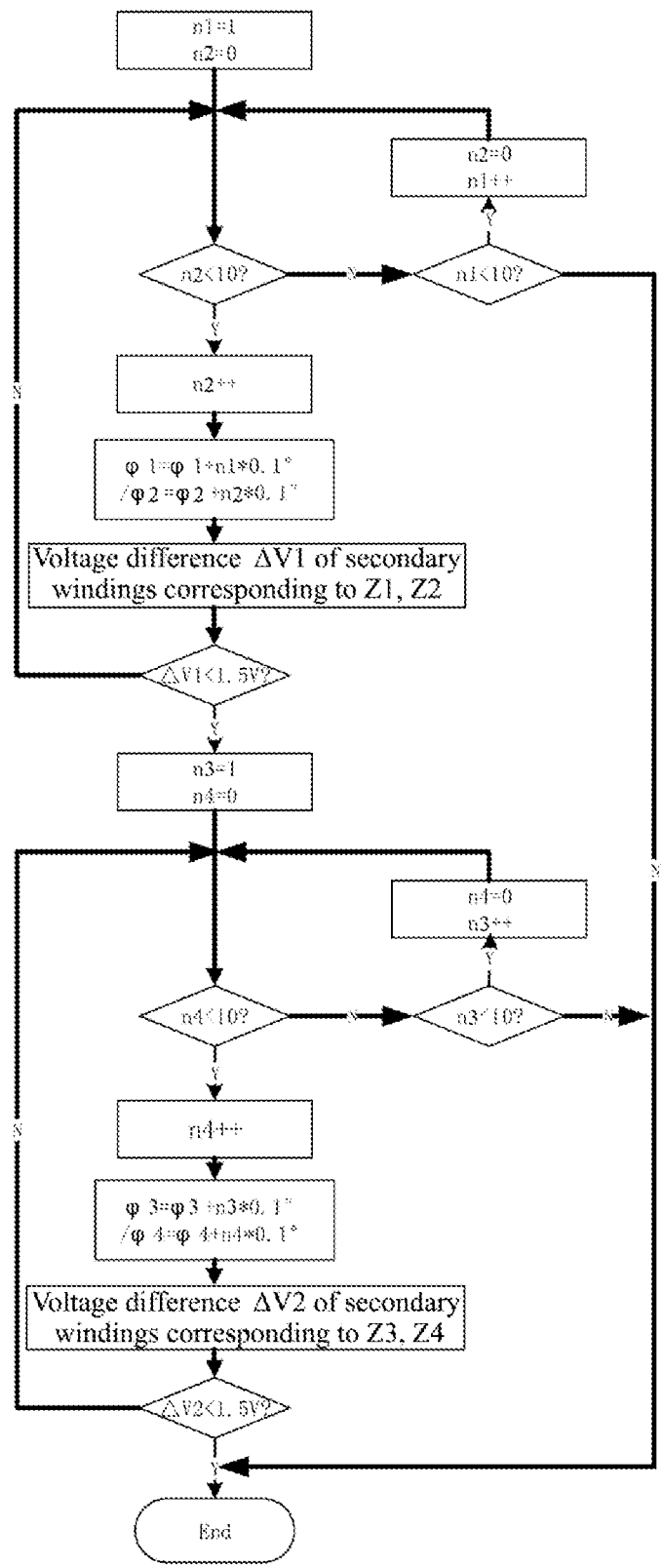
FIG. 8 is a flow chart of adjustment iteration inner loop of phase shift angle of a new type of 24-pulse transformer provided by the present disclosure.

FIG. 7 is a flow chart of a phase shift angle adjustment of a new type of 24-pulse transformer provided by the present disclosure. FIG. 8 is a flow chart of adjustment iteration inner loop of a phase shift angle of a new type of 24-pulse transformer provided by the present disclosure. FIG. 5B is an illustrative example of a new type of 24-pulse transformer. The embodiment of the present disclosure will be described in detail below with reference to FIGS. 5B, 7 and 8.

(1) Determine a number of turns of a primary winding of the transformer according to predetermined transformer parameters (transformer capacity, input voltage, output voltage and current density);

(2) Initialize phase shift angles $\varphi 1$, $\varphi 2$, $\varphi 3$ and $\varphi 4$ for the secondary windings Z1, Z2, Z3 and Z4 as follows. Set the initial value of the phase shift angle $\varphi 1$ of Z1 to a°, and then the initial value of the phase shift angle $\varphi 2$ is equal to $\varphi 1+15°$, the initial value of the phase shift angle $\varphi 3$ is equal to $\varphi 1+30°$, and the initial value of the phase shift angle $\varphi 4$ is equal to $\varphi 1+45°$.

(3) Round the theoretical number of turns of the secondary windings Z1 and Z3, and the secondary windings Z2 and Z4 to obtain the actual number of turns of the secondary windings Z1, Z2, Z3 and Z4.

Specifically, Calculate the theoretical number of turns of the secondary windings Z1, Z2, Z3 and Z4 according to the transformer parameters, the corresponding initialized phase shift angles $\varphi 1$, $\varphi 2$, $\varphi 3$ and $\varphi 4$ of the secondary windings Z1, Z2, Z3 and Z4, and the number of turns of the primary winding. And then round the theoretical number of turns of the secondary windings Z1, Z2, Z3 and Z4.

(4) Calculate the output voltages of the secondary windings Z1 and Z2 according to the actual number of turns of the secondary windings Z1 and Z2, calculate the output voltages of the secondary windings Z3 and Z4 according to the actual number of turns of the secondary windings Z3 and Z4.

(5) Calculate a voltage difference $\Delta V_1$ between the secondary windings Z1 and Z2, and a voltage difference $\Delta V_2$ between the secondary windings Z3 and Z4;

(6) Determine whether $\Delta V_1$ is less than or equal to 1.5V, and whether $\Delta V_2$ is less than or equal to 1.5V;

(7) If yes, end the adjustment; if not, determine whether the number of adjustment times n1, n2, n3 and n4 corresponding to Z1, Z2, Z3 and Z4 are greater than the preset number of times (e.g., 10 times);

(8) If not greater than the preset number of times, enter the adjustment iteration inner loop. If greater than the preset number of times, enter the adjustment iteration outer loop, that is, let $\varphi 1=\varphi 1+1°$, $\varphi 2=\varphi 2+1°$, $\varphi 3=\varphi 3+1°$, $\varphi 4=\varphi 4+1°$ while n1, n2, n3 and n4 are reset to 0.

For the new type of 24-pulse transformer, its adjustment iteration inner loop is shown in FIG. 8. First, adjust the value of the phase shift angle $\varphi 1$ of the first secondary winding Z1 in the first winding pair once by 0.1°, and record n1=1, n2=0; then adjust the value of the phase shift angle $\varphi 2$ of the first secondary winding Z2 when Z1 has been adjusted once. That is, first determine whether n2 is less than 10 (i.e., the preset number of times) and, if it is less than 10, then n2+1, adjust the value of the phase shift angle $\varphi 2$ of the first secondary winding Z2 correspondingly by 0.1°, and then calculate the voltage difference $\Delta V_1$ between Z1 and Z2 and determine whether $\Delta V_1$ is less than or equal to 1.5 V (i.e., the preset threshold). If not, go back to determine whether n2 is less than 10. When n2 is equal to 10, it means $\Delta V_1$ has been calculated for all the cases of $\varphi 1=0.1$ and $\varphi 2=30.1$, 30.2 . . . , 31. At this time, it is necessary to determine whether n1 is less than 10. If it is, n1+1 and reset n2 to 0. At this time, the calculation cycle of ($\varphi 1=0.2$, $\varphi 3=30.1$, 30.2 . . . , 31) begins. If n1 is equal to 10, it means the phase shift angles of Z1 and Z2 have been adjusted for 10 times but the preset condition is still not met. At this time, end the adjustment iteration inner loop and enter the adjustment iteration outer loop (that is, add 1° to the initial values of the phase shift angles corresponding to Z1, Z2, Z3 and Z4). If the preset condition is met within 10 times of adjustments of Z1 or Z2, move on to adjust the phase shift angles of Z3 and Z4 of the second winding pair, and the adjustment process is similar to that of the first winding pair, which will not be repeated herein.

Moreover, as shown in FIG. 8, in the new 24-pulse transformer, as long as any one of the first winding pair and the second winding pair has gone through the adjustment iteration inner loop but the preset condition is still not met, all phase shift angles of Z1, Z2, Z3 and Z4 will be adjusted by 1° at the same time, that is, enter the iteration outer loop.

In addition, in the transformer defined in this embodiment, only the output voltages of the first winding pair Z1 and Z2 and the output voltages of the second winding pair Z2 and Z4 need to be determined whether the preset condition is met. Compared with determining the differences between output voltages of Z1-Z2, Z1-Z3, Z1-Z4, Z2-Z3, Z2-Z4, and Z3-Z4 as required by the 24-pulse transformer shown in FIG. 2, the transformer defined in this embodiment improves the efficiency of adjusting the phase shift angles.

In the design method of the transformer provided by the embodiment of the present disclosure, each secondary winding set includes N winding pairs, each winding pair includes a first secondary winding and a second secondary winding, and the difference between phase shift angles of the first secondary winding and the second secondary winding is 30°. Each power conversion unit includes two input terminals and one output terminal, and the output terminals of both the first secondary winding and the second secondary winding are electrically connected to the two input terminals of one power conversion unit, respectively, where N is a positive integer. The adjusting the phase shift angle of at least one secondary winding in each secondary winding set includes: determining that differences between output voltages of j winding pairs are greater than the preset threshold and thus the preset condition is not met; adjusting a phase shift angle of a first secondary winding of each winding pair of the j winding pairs according to a first preset incremental angle; if the phase shift angle of the first secondary winding of each of the j winding pairs has been adjusted according to the first preset incremental angle by more than a preset number of times but the preset condition is still not met, adjusting a phase shift angle of a second secondary winding of each of the j winding pairs according to the first preset incremental angle, where $1<=j<=N$. This embodiment improves the efficiency of adjusting the phase shift angles of the secondary windings.

Figure 9:
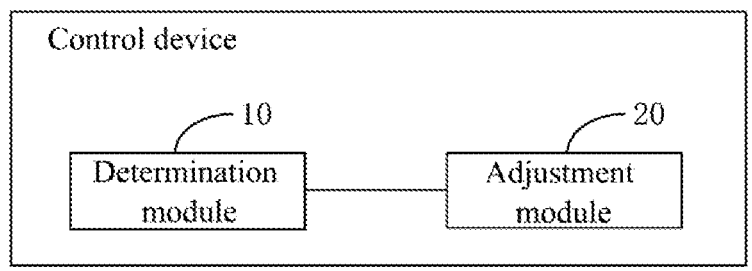
FIG. 9 is a schematic structural diagram of a control device provided by the present disclosure.

In a second aspect, an example of the present disclosure provides a control device. FIG. 9 is a schematic structural diagram of a control device provided by the present disclosure. The control device is used for the design of a transformer. The transformer includes at least one secondary winding set arranged on a secondary side, each secondary winding set including a plurality of secondary windings; and an output terminal of a secondary winding in a secondary winding set is connected to corresponding input terminal of a power conversion unit. As shown in FIG. 9, the control device includes a determination module 10, an adjustment module 20.

The determination module 10 is configured to determine, according to a phase shift angle and a number of turns of the secondary winding in the secondary winding set, a difference between output voltages of a secondary winding pair in the secondary winding set; an adjustment module 20, configured to adjust the phase shift angle of at least one secondary winding in the secondary winding set when the preset condition is not met, where the preset condition is that the difference between output voltages of any secondary winding pair in the secondary winding set is less than or equal to a preset threshold; where the phase shift angle when the preset condition is met is a final phase shift angle for the secondary winding, and a number of turns corresponding to the final phase shift angle is a final number of turns for the secondary winding.

In another optional implementation, the determination module 10 is specifically configured to: determine, according to a transformer parameter and the phase shift angle of the secondary winding, a theoretical number of turns of the secondary winding; round the theoretical number of turns of the secondary winding to an integer to obtain an actual number of turns of the secondary winding; calculate, according to the transformer parameter and the actual number of turns of the secondary winding, an output voltage of the secondary winding; determine, according to output voltages of the secondary windings, the difference between the output voltages of any one of the secondary winding pairs.

In another optional implementation, the adjustment module 20 is specifically configured to: adjust, according to a first preset incremental angle, a phase shift angle of an i-th secondary winding in the secondary winding set, where i is greater than or equal to 1 and; if the phase shift angle of the i-th secondary winding has been adjusted according to the first preset incremental angle by more than a preset number of times but the preset condition is still not met, adjust a phase shift angle of an (i+1)-th secondary winding in the secondary winding set according to the first preset incremental angle.

In another optional implementation, the adjustment module 20 is further configured to: if phase shift angles of all secondary windings in the secondary winding set have been adjusted according to the first preset incremental angle by more than the preset number of times but the preset condition is still not met, adjust the phase shift angles of all secondary windings in the secondary winding set according to a second preset incremental angle, and repeat the step of adjusting a phase shift angle of at least one secondary winding in each secondary winding set, where the second preset incremental angle is greater than the first preset incremental angle.

In another optional implementation, each secondary winding set includes N winding pairs, each winding pair includes a first secondary winding and a second secondary winding, and the difference between phase shift angles of the first secondary winding and the second secondary winding is 30°; each power conversion unit includes two input terminals and one output terminal, and the output terminals of both the first secondary winding and the second secondary winding are electrically connected to the two input terminals of one power conversion unit, respectively, where N is a positive integer. The adjustment module 20 is configured to: determine that differences between output voltages of j winding pairs are greater than the preset threshold and thus the preset condition is not met; adjust a phase shift angle of a first secondary winding of each winding pair of the j winding pairs according to a first preset incremental angle; if the phase shift angle of the first secondary winding of each of the j winding pairs has been adjusted according to the first preset incremental angle by more than a preset number of times but the preset condition is still not met, adjust a phase shift angle of a second secondary winding of each of the j winding pairs according to the first preset incremental angle, where $1<=j<=N$.

In another optional implementation, the adjustment module 20 is further configured to: if the phase shift angles of both the first secondary winding and the second secondary winding of any one of the j winding pairs have been adjusted according to the first preset incremental angle by more than the preset number but the preset condition is still not met, adjust phase shift angles of all secondary windings in the secondary winding set according to the second preset incremental angle, and repeat the step of adjusting the phase shift angle of at least one secondary winding in each secondary winding set, where the second preset incremental angle is greater than the first preset incremental angle.

In another optional implementation, the secondary winding set includes a first winding pair and a second winding pair, the first winding pair includes a first secondary winding and a second secondary winding, output terminals of both the first secondary winding and the second secondary winding are connected to input terminals of a first power conversion unit corresponding to the first winding pair, the second winding pair includes a third secondary winding and a fourth secondary winding, output terminals of both the third secondary winding and the fourth secondary winding are connected to input terminals of a second power conversion unit corresponding to the second winding pair, and phases of output voltage of the first secondary winding, the third secondary winding, the second secondary winding and the fourth secondary winding are shifted, in the same order, to left or right by 15°. The adjustment module 20 is specifically configured to: adjust the phase shift angle of the first secondary winding in the first winding pair according to the first preset incremental angle and, if the phase shift angle of the first secondary winding has been adjusted according to the first preset incremental angle by more than the preset number of times but the difference between output voltages of the first secondary winding and the second secondary winding still does not meet the preset condition, adjust the phase shift angle of the second secondary winding in the first secondary winding set according to the first preset incremental angle; adjust a phase shift angle of the third secondary winding in the second secondary winding set according to the first preset incremental angle and, if the phase shift angle of the third secondary winding has been adjusted according to the first preset incremental angle by more than the preset number of times but the difference between output voltages of the third secondary winding and the fourth secondary winding still does not meet the preset condition, adjust the phase shift angle of the fourth secondary winding in the second secondary winding set according to the first preset incremental angle.

In another optional implementation, the adjustment module 20 is further configured to: if the phase shift angles of both the first secondary winding and the second secondary winding have been adjusted according to the first preset incremental angle by more than the preset number of times but the difference between output voltages of the first secondary winding and the second secondary winding still does not meet the preset condition, or if the phase shift angles of the third secondary winding and the fourth secondary winding have been adjusted according to the first preset incremental angle by more than the preset number of times but the differences between output voltages of the third secondary winding and the fourth secondary winding do not meet the preset condition, adjusting the phase shift angles of the first secondary winding, the second secondary winding, the third secondary winding and the fourth secondary winding according to a second preset incremental angle, and repeating the step of adjusting the phase shift angle of at least one secondary winding in each secondary winding set.

In another optional implementation, the preset threshold is 1.5V, the first preset incremental angle is 0.1°, the second preset incremental angle is 1°, and the preset number of times is 10.

Those skilled in the art can clearly understand that, for the convenience and conciseness of description, the specific working process and corresponding beneficial effects of the control device described above can be found in the corresponding process in the foregoing method examples, which will not be repeated herein.

Figure 10:
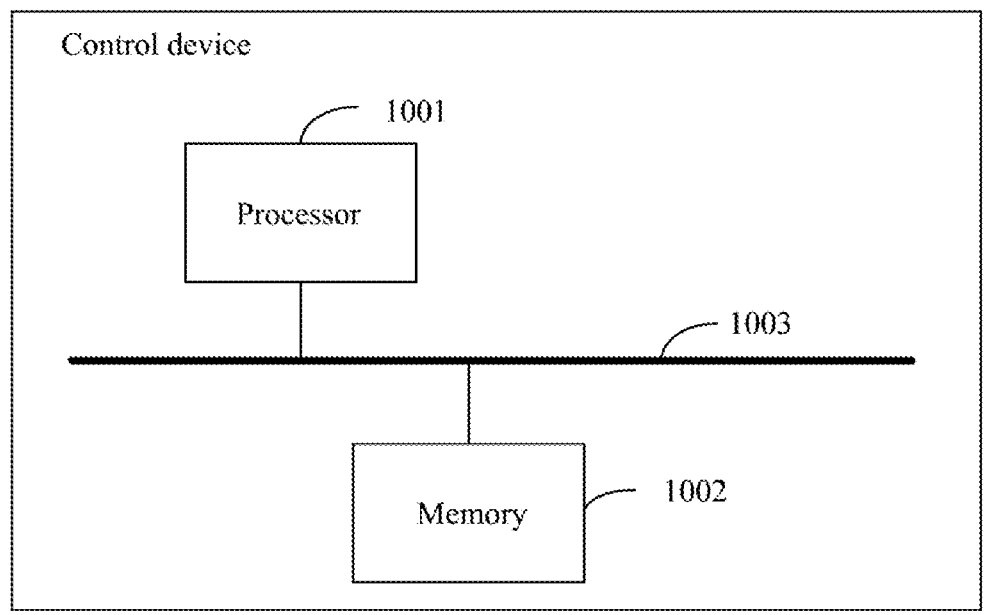
FIG. 10 is a schematic diagram of the hardware structure of a control device provided by the present disclosure.

An example of the present disclosure also provides a control device. FIG. 10 is a schematic diagram of a hardware structure of a control device provided by the present disclosure. As shown in FIG. 10, the control device includes:

at least one processor 1001 and a memory 1002.

In a specific implementation process, the at least one processor 1001 executes computer-executable instructions stored in the memory 1002, enabling the at least one processor 1001 to execute the above design method of the transformer, where the processor 1001 and the memory 1002 are connected through a bus 1003.

For the specific implementation process of the processor 1001, please refer to the foregoing method embodiments for the implementation principles and technical effects are similar, which will not be repeated here.

In the above embodiment shown in FIG. 10, it should be understood that the processor may be a central processing unit (CPU), or may be other general-purpose processors, digital signal processors (DSP), application specific integrated circuits (ASIC), etc. The general-purpose processor may be a microprocessor or any conventional processor or the like. The steps of the methods disclosed in combination with the disclosure can be directly embodied as executed by a hardware processor, or executed by a combination of hardware and software modules in the processor.

The memory may include high-speed RAM memory, and may also include non-volatile memory (NVM), such as at least one disk storage.

The bus may be an industry standard architecture (ISA) bus, a peripheral component interconnect (PCI) bus, or an extended industry standard architecture (EISA) bus or the like. The bus can be divided into address bus, data bus, control bus, etc. For ease of representation, the bus in the accompanying drawings of the present application is not limited to only one bus or one type of bus.

An example of the present disclosure also provides a transformer system, which can be referred to as shown in FIG. 3, including a transformer and the control device as described above. The transformer includes at least one secondary winding set arranged on a secondary side, each secondary winding set including a plurality of secondary windings; and an output terminal of a secondary winding in a secondary winding set is connected to corresponding input terminal of a power conversion unit.

Those skilled in the art can clearly understand that, for the convenience and conciseness of description, the specific working process and corresponding beneficial effects of the transformer system described above can be found in the corresponding process in the foregoing method example, which will not be repeated herein.

The present disclosure also provides a readable storage medium having stored thereon computer-executable instructions which, when executed by a processor, implement the above design method of the transformer.

The readable storage medium can be embodied as any type of volatile or non-volatile storage device or a combination thereof, such as the static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk. A readable storage medium may be any available medium that can be accessed by a general purpose or special purpose computer.

An exemplary readable storage medium is coupled to the processor, so that the processor can read information from the readable storage medium and can write information to the readable storage medium. Of course, the readable storage medium may also be an integral part of the processor. The processor and the readable storage medium may be located in an Application Specific Integrated Circuit (ASIC). Of course, the processor and the readable storage medium may also exist in the device as discrete components.

Those of ordinary skill in the art can understand that all or part of the steps for implementing the above method embodiments can be completed by hardware related to program instructions. The aforementioned program can be stored in a computer readable storage medium. The program, when being executed, causes the steps included in the foregoing method embodiments to be executed; and the storage medium includes various media that can store program codes: the ROM, RAM, magnetic disk or optical disk, etc.

Finally, it should be noted that: the above embodiments are only used to illustrate the technical solutions of the present disclosure, not to constitute a limitation on it. Although the present disclosure has been described in detail with reference to the foregoing embodiments, those skilled in the art should understand that it is still possible to modify the technical solutions recorded in the above embodiments, or equivalently replace some or all of the technical features; and these modifications or replacements do not cause the essence of the corresponding technical solutions to deviate from the scope of technical solutions of the embodiments of the present disclosure.

What is claimed is:

1. A design method of a transformer, wherein the transformer comprises at least one secondary winding set, each secondary winding set comprises a plurality of secondary windings; and the method comprises:
repeating following steps until a preset condition is met:
calculating an output voltage of each secondary winding according to a phase shift angle and a number of turns of each secondary winding;
obtaining a difference between output voltages of each secondary winding pair in the secondary winding set;
adjusting the phase shift angle of at least one secondary winding in the secondary winding set; and
obtaining a final number of turns for each secondary winding according to a resultant phase shift angle corresponding to when the preset condition is met;
wherein the preset condition is that the difference between the output voltages of any secondary winding pair in the secondary winding set is less than or equal to a preset threshold;
wherein the adjusting the phase shift angle of at least one secondary winding in the secondary winding set comprises:
adjusting a phase shift angle of an i-th secondary winding in the secondary winding set according to a first preset incremental angle; and
adjusting a phase shift angle of an (i+1)-th secondary winding in the secondary winding set according to the first preset incremental angle if the phase shift angle of the i-th secondary winding has been adjusted according to the first preset incremental angle by more than a preset number of times but the preset condition is still not met,
wherein i is greater than or equal to 1.

2. The method according to claim 1, wherein the calculating an output voltage of each secondary winding according to a phase shift angle and a number of turns of each secondary winding further comprises:
calculating a theoretical number of turns of each secondary winding according to transformer parameters and the phase shift angle of the secondary winding; and
rounding the theoretical number of turns of the secondary winding to obtain the number of turns of each secondary winding.

3. The method according to claim 1, wherein the adjusting the phase shift angle of at least one secondary winding in the secondary winding set further comprises:
adding a second preset incremental angle to initial phase shift angles of all secondary windings in the secondary winding set if the phase shift angles of all secondary windings in the secondary winding set have been adjusted according to the first preset incremental angle by more than the preset number of times but the preset condition is still not met;
wherein the second preset incremental angle is greater than the first preset incremental angle.

4. The method according to claim 1, wherein the secondary winding set comprises N winding pairs, each winding pair comprises a first secondary winding and a second secondary winding, and a difference between phase shift angles of the first secondary winding and the second secondary winding is 30°, wherein N is a positive integer.

5. The method according to claim 4, wherein when differences between output voltages of j winding pairs are greater than the preset threshold, the adjusting the phase shift angle of at least one secondary winding in the secondary winding set comprises:
adjusting a phase shift angle of the first secondary winding of each of the j winding pairs according to a first preset incremental angle; and
adjusting a phase shift angle of the second secondary winding of the each of the j winding pairs according to the first preset incremental angle if the phase shift angle of the first secondary winding of the each of the j winding pairs has been adjusted according to the first preset incremental angle by more than a preset number of times but the preset condition is still not met;
wherein $1 \leq j \leq N$.

6. The method according to claim 4, wherein the adjusting the phase shift angle of at least one secondary winding in the secondary winding set further comprises:
adding a second preset incremental angle to initial phase shift angles of all secondary windings in the secondary winding set if the phase shift angles of the first secondary winding and the second secondary winding of any one of the j winding pairs have been adjusted according to the first preset incremental angle by more than the preset number of times but the preset condition is still not met,
wherein the second preset incremental angle is greater than the first preset incremental angle.

7. The method according to claim 1, wherein the secondary winding set comprises a first winding pair and a second winding pair, the first winding pair comprises a first secondary winding and a second secondary winding, output terminals of both the first secondary winding and the second secondary winding are connected to input terminals of a first power conversion unit, the second winding pair comprises a third secondary winding and a fourth secondary winding, output terminals of the third secondary winding and the fourth secondary winding are connected to input terminals of a second power conversion unit, and phases of output voltage of the first secondary winding, the third secondary winding, the second secondary winding and the fourth secondary winding are shifted, in the same order, to left or right by 15°.

8. The method according to claim 7, wherein the adjusting the phase shift angle of at least one secondary winding in the secondary winding set comprises:
adjusting a phase shift angle of the first secondary winding according to a first preset incremental angle, and
adjusting a phase shift angle of the second secondary winding according to the first preset incremental angle if the phase shift angle of the first secondary winding has been adjusted according to the first preset incremental angle by more than the preset number of times but a difference between output voltages of the first secondary winding and the second secondary winding still does not meet the preset condition;
adjusting a phase shift angle of the third secondary winding according to the first preset incremental angle, and
adjusting a phase shift angle of the fourth secondary winding according to the first preset incremental angle if the phase shift angle of the third secondary winding has been adjusted according to the first preset incremental angle by more than the preset number of times but a difference between output voltages of the third secondary winding and the fourth secondary winding still does not meet the preset condition.

9. The method according to claim 8, wherein the adjusting the phase shift angle of at least one secondary winding in the secondary winding set further comprises: adding a second preset incremental angle to initial phase shift angles of the first secondary winding, the second secondary winding, the third secondary winding and the fourth secondary winding if the phase shift angles of the first secondary winding and the second secondary winding have been adjusted according to the first preset incremental angle by more than the preset number of times but the difference between output voltages of the first secondary winding and the second secondary winding does not meet the preset condition, or if the phase shift angles of the third secondary winding and the fourth secondary winding have been adjusted according to the first preset incremental angle by more than the preset number of times but the difference between output voltages of the third secondary winding and the fourth secondary winding does not meet the preset condition.

10. A control device for designing a transformer, wherein the transformer comprises at least one secondary winding set, each secondary winding set comprises a plurality of secondary windings; and the device comprises:
a processor configured to repeat following steps until a preset condition is met:
calculating an output voltage of each secondary winding according to a phase shift angle and a number of turns of each secondary winding;
obtaining a difference between output voltages of each secondary winding pair in a secondary winding set;
adjusting the phase shift angle of at least one secondary winding in the secondary winding set; and
obtain a final number of turns for each secondary winding according to a resultant phase shift angle corresponding to when the preset condition is met,
wherein the preset condition is that the difference between the output voltages of any secondary winding pair in the secondary winding set is less than or equal to a preset threshold;
wherein the processor is further configured to:
adjust a phase shift angle of an i-th secondary winding in the secondary winding set according to a first preset incremental angle; and
adjust a phase shift angle of an (i+1)-th secondary winding in the secondary winding set according to the first preset incremental angle if the phase shift angle of the i-th secondary winding has been adjusted according to the first preset incremental angle by more than a preset number of times but the preset condition is still not met,
wherein i is greater than or equal to 1.

11. The control device according to claim 10, wherein the processor is further configured to:
calculate a theoretical number of turns of each secondary winding according to transformer parameters and the phase shift angle of the secondary winding; and
round the theoretical number of turns of the secondary winding to obtain the number of turns of each secondary winding.

12. The control device according to claim 10, wherein the processor is further configured to:
add a second preset incremental angle to initial phase shift angles of all secondary windings in the secondary winding set if the phase shift angles of all secondary windings in the secondary winding set have been adjusted according to the first preset incremental angle by more than the preset number of times but the preset condition is still not met,
wherein the second preset incremental angle is greater than the first preset incremental angle.

13. The control device according to claim 10, wherein the secondary winding set comprises N winding pairs, each winding pair comprises a first secondary winding and a second secondary winding, and a difference between phase shift angles of the first secondary winding and the second secondary winding is 30°, wherein N is a positive integer.

14. The control device according to claim 13, wherein the processor is further configured to:
when differences between output voltages of j winding pairs are greater than the preset threshold,
adjust a phase shift angle of the first secondary winding of each of the j winding pairs according to a first preset incremental angle; and
adjust a phase shift angle of the second secondary winding of the each of the j winding pairs according to the first preset incremental angle if the phase shift angle of the first secondary winding of the each of the j winding pairs has been adjusted according to the first preset incremental angle by more than a preset number of times but the preset condition is still not met;
wherein $1<=j<=N$.

15. The control device according to claim 13, wherein the processor is further configured to:
add a second preset incremental angle to initial phase shift angles of all secondary windings in the secondary winding set if the phase shift angles of the first secondary winding and the second secondary winding of any one of the j winding pairs have been adjusted according to the first preset incremental angle by more than the preset number of times but the preset condition is still not met,
wherein the second preset incremental angle is greater than the first preset incremental angle.

16. The control device according to claim 10, wherein the secondary winding set comprises a first winding pair and a second winding pair, the first winding pair comprises a first secondary winding and a second secondary winding, output terminals of both the first secondary winding and the second secondary winding are connected to input terminals of a first power conversion unit, the second winding pair comprises a third secondary winding and a fourth secondary winding, output terminals of the third secondary winding and the fourth secondary winding are connected to input terminals of a second power conversion unit, and phases of output voltage of the first secondary winding, the third secondary winding, the second secondary winding and the fourth secondary winding are shifted, in the same order, to left or right by 15°.

17. The control device according to claim 16, wherein the processor is further configured to:
adjust a phase shift angle of the first secondary winding according to a first preset incremental angle, and
adjust a phase shift angle of the second secondary winding according to the first preset incremental angle if the phase shift angle of the first secondary winding has been adjusted according to the first preset incremental angle by more than the preset number of times but a difference between output voltages of the first secondary winding and the second secondary winding still does not meet the preset condition;
adjust a phase shift angle of the third secondary winding according to the first preset incremental angle, and
adjust a phase shift angle of the fourth secondary winding according to the first preset incremental angle if the phase shift angle of the third secondary winding has been adjusted according to the first preset incremental angle by more than the preset number of times but a difference between output voltages of the third secondary winding and the fourth secondary winding still does not meet the preset condition,
wherein the processor is further configured to:
add a second preset incremental angle to initial phase shift angles of the first secondary winding, the second secondary winding, the third secondary winding and the fourth secondary winding if the phase shift angles of the first secondary winding and the second secondary winding have been adjusted according to the first preset incremental angle by more than the preset number of times but the difference between output voltages of the first secondary winding and the second secondary winding does not meet the preset condition, or if the phase shift angles of the third secondary winding and the fourth secondary winding have been adjusted according to the first preset incremental angle by more than the preset number of times but the difference between output voltages of the third secondary winding and the fourth secondary winding does not meet the preset condition.

18. A non-transitory computer readable storage medium, storing thereon computer-executable instructions which, when being executed by a processor, enables the processor to implement following operations:
repeating following steps until a preset condition is met:
calculating an output voltage of each secondary winding according to a phase shift angle and a number of turns of each secondary winding;
obtaining a difference between output voltages of each secondary winding pair in a secondary winding set;
adjusting the phase shift angle of at least one secondary winding in the secondary winding set; and
obtaining a final number of turns for each secondary winding according to a resultant phase shift angle corresponding to when the preset condition is met,
wherein the preset condition is that the difference between the output voltages of any secondary winding pair in the secondary winding set is less than or equal to a preset threshold;
wherein the adjusting the phase shift angle of at least one secondary winding in the secondary winding set comprises:
adjusting a phase shift angle of an i-th secondary winding in the secondary winding set according to a first preset incremental angle; and
adjusting a phase shift angle of an (i+1)-th secondary winding in the secondary winding set according to the first preset incremental angle if the phase shift angle of the i-th secondary winding has been adjusted according to the first preset incremental angle by more than a preset number of times but the preset condition is still not met,
wherein i is greater than or equal to 1.

* * * * *